(12) United States Patent
Matsuda et al.

(10) Patent No.: US 7,436,863 B2
(45) Date of Patent: Oct. 14, 2008

(54) FIBER LASER BEAM PROCESSING APPARATUS

(75) Inventors: Yasushi Matsuda, Chiba-ken (JP);
Hidenori Shimada, Chiba-ken (JP);
Kouichi Yaginuma, Chiba-ken (JP);
Shingo Tanaka, Chiba-ken (JP)

(73) Assignee: Miyachi Technos Corporation, Chiba-Ken (JP)

( * ) Notice: Subject to any disclaimer, the term of this patent is extended or adjusted under 35 U.S.C. 154(b) by 0 days.

(21) Appl. No.: 11/653,892

(22) Filed: Jan. 17, 2007

(65) Prior Publication Data
US 2007/0164004 A1 Jul. 19, 2007

(30) Foreign Application Priority Data
Jan. 17, 2006 (JP) ............................. 2006-008693

(51) Int. Cl.
*H01S 3/30* (2006.01)

(52) U.S. Cl. ............................. 372/6; 372/101; 372/108

(58) Field of Classification Search .................... 372/6, 372/101, 108
See application file for complete search history.

(56) References Cited

U.S. PATENT DOCUMENTS

| 5,455,835 | A | * | 10/1995 | Atkins et al. ............... 372/6 |
| 6,160,568 | A | | 12/2000 | Brodsky et al. |
| 6,275,250 | B1 | | 8/2001 | Sanders et al. |
| 2006/0056470 | A1 | * | 3/2006 | Liu et al. ............... 372/38.1 |
| 2007/0189339 | A1 | | 8/2007 | Matsuda et al. |

FOREIGN PATENT DOCUMENTS

EP 1 650 839 A1 4/2006

* cited by examiner

*Primary Examiner*—Dung T Nguyen
(74) *Attorney, Agent, or Firm*—Wenderoth, Lind & Ponack, L.L.P.

(57) ABSTRACT

A fiber laser beam processing apparatus is configured by a fiber laser oscillator, a laser power source unit, a laser beam injecting unit, a fiber transmission system, a laser beam irradiating unit, a processing table, etc. A portion of a fiber laser beam oscillated and outputted by the fiber laser oscillator is received by a photo diode for monitoring the power through a beam splitter. An output signal of the photo diode is sent to a laser power source unit. The power source unit receives the output signal of the photo diode as a feedback signal and controls a driving current or an excitation current to be supplied to a laser diode of a pumping unit such that the laser output of the fiber laser beam equals a set value.

3 Claims, 2 Drawing Sheets

FIBER LASER BEAM PROCESSING APPARATUS

BACKGROUND OF THE INVENTION

1. Field of the Invention

The present invention relates to a laser beam processing apparatus that executes laser beam processing using a fiber laser beam.

2. Description of the Related Art

Conventionally, a laser having an optical-fiber structure is known that oscillates and outputs a raw laser beam having a predetermined wavelength by optically pumping a core thereof including a luminous element using an excitation beam, so called a "fiber laser". Because the fiber laser uses a very elongated core as the active medium thereof, the fiber laser can oscillate and output a laser beam having a small beam diameter and a small beam divergence angle (a fiber laser beam). In addition, the excitation beam injected into the fiber consumes completely the excitation energy thereof by crossing many times the core while the ray propagates on a long optical path and, therefore, a fiber laser beam can be created at a very high oscillation efficiency. In addition, for the fiber laser, the beam mode of the fiber laser beam is very stable because the core of the fiber generates no thermal lens effect.

The conventional fiber laser beam processing apparatus sets an electric current value for excitation corresponding to a desired laser output, and a laser power source supplies an excitation current corresponding to the current value having been set to an excitation light source such as, for example, a laser diode (LD). Because the length of the fiber for the fiber laser can arbitrarily be selected, an output end terminal of the fiber laser is brought to a processing site and a fiber laser beam oscillated and outputted from the fiber laser is directly applied to a processing point on a work to be processed through a condensing optical system.

However, the conventional fiber laser beam processing apparatus has an aspect of unstable laser output thereof due to an influence of degradation of the excitation LD, a wavelength shift, etc. Therefore, the reproducibility and the reliability of the laser beam processing are poor. Because the fiber laser is also vulnerable to influences of the heat, vibrations, ambient light, etc., problems have also arisen that the fiber laser tend to occur degradation of the laser oscillation performance, damage, degradation, etc., of components thereof (the optical fiber for oscillation, optical resonator, etc.).

SUMMARY OF THE INVENTION

The present invention was conceived in view of the above conventional technical problems and an object of the present invention is to provide a fiber laser beam processing apparatus that improves the stability of the fiber laser output and, as a result, improves the reproducibility and the reliability of the laser beam processing.

Another object of the present invention is to provide a fiber laser beam processing apparatus adapted to prevent degradation of the laser oscillation performance and damages and degradation of the oscillating optical fiber by reducing influences exerted from disturbances at the processing site on the fiber laser or the fiber laser oscillator.

In order to achieve the above objects, according to a first aspect of the present invention there is provided a fiber laser beam processing apparatus comprising an optical fiber for oscillation including a core containing a luminous element, and a clad surrounding the core; an pumping unit to supply the core of the optical fiber for oscillation with an excitation beam; a power source unit that turns on and drives the pumping unit to cause the optical fiber for oscillation to oscillate and output a laser beam having a predetermined wavelength; a laser beam irradiating unit that condenses and applies the laser beam generated by the optical fiber for oscillation onto a processing point on a work to be processed; a setting unit that sets a desired reference value or a desired reference waveform for a laser output of the laser beam; a laser output measuring unit that measures the laser output of the laser beam oscillated and outputted by the optical fiber for oscillation; and a controlling unit that controls the power source unit such that a laser output measured value obtained from the laser output measuring unit equals the reference value or the reference waveform.

In order to achieve the above objects, according to a second aspect of the present invention there is provided a fiber laser beam processing apparatus comprising a fiber laser oscillator having an optical-fiber structure that employs a core containing a luminous element as an active medium oscillates and outputs a laser beam having a predetermined wavelength by optically pumping the core using a predetermined excitation beam; a laser beam irradiating unit that irradiates the laser beam oscillated and outputted by the fiber laser oscillator toward a processing point on a work to be processed; a laser output measuring unit that measures a laser output of the laser beam oscillated and outputted by the fiber laser oscillator; and a laser power source unit that controls the output of the excitation beam used by the fiber laser oscillator by feeding back a laser output measured value obtained from the laser output measuring unit.

In the fiber laser beam processing apparatus of the present invention, the laser output (power) of the fiber laser beam generated by the oscillating fiber or the fiber laser oscillator is normally stabilized accurately corresponding to the desired reference value or the desired reference waveform according to the real-time power feedback control. Therefore, even when any of variation of the power source unit output, degradation of the pumping unit, shifting of wavelength, etc., has occurred, the arbitrary control of the waveform can be executed stably and accurately and the reproducibility and the reliability of the laser beam processing can be improved.

According to a preferred aspect of the present invention, a fiber laser beam generated by an oscillating fiber or a fiber laser oscillator is injected into a transmitting optical fiber and is transmitted to a laser beam irradiating unit at a processing site. According to this configuration, the beam mode and the laser output of the fiber laser beam are both stable. Therefore, the convergence onto the transmitting optical fiber can be excellent, and the injection and the irradiating numerical apertures (NAs) can be stable. Therefore, high-precision and high-efficiency fiber transmission is enabled and the quality of remote laser beam processing can be improved. In addition, the oscillating optical fiber or the fiber laser oscillator can be placed away from the processing site and, therefore, the fiber laser oscillator can be protected against the disturbances such as the heat, vibrations, ambient light, etc.

According to another preferred aspect, a pair of resonator mirrors optically facing each other through the core of an oscillating optical fiber are provided, and a pumping unit has a laser diode that emits an excitation beam, and an optical lens that converges the excitation beam from the laser diode onto an end face of the oscillating optical fiber.

According to the fiber laser beam processing apparatus of the present invention, based on the above configuration and actions, the stability of the fiber laser output can be improved and, as a result, the reproducibility and the reliability of laser beam processing can be improved and, in addition, by reducing influences exerted from the disturbances at the processing site on the fiber laser or the fiber laser oscillator, degradation of the laser oscillation performance and damages and degradation of the oscillating optical fiber can be prevented.

DESCRIPTION OF THE PREFERRED EMBODIMENTS

Description will be given below for a preferred embodiment of the present invention referring to the accompanying drawings.

Figure 1:
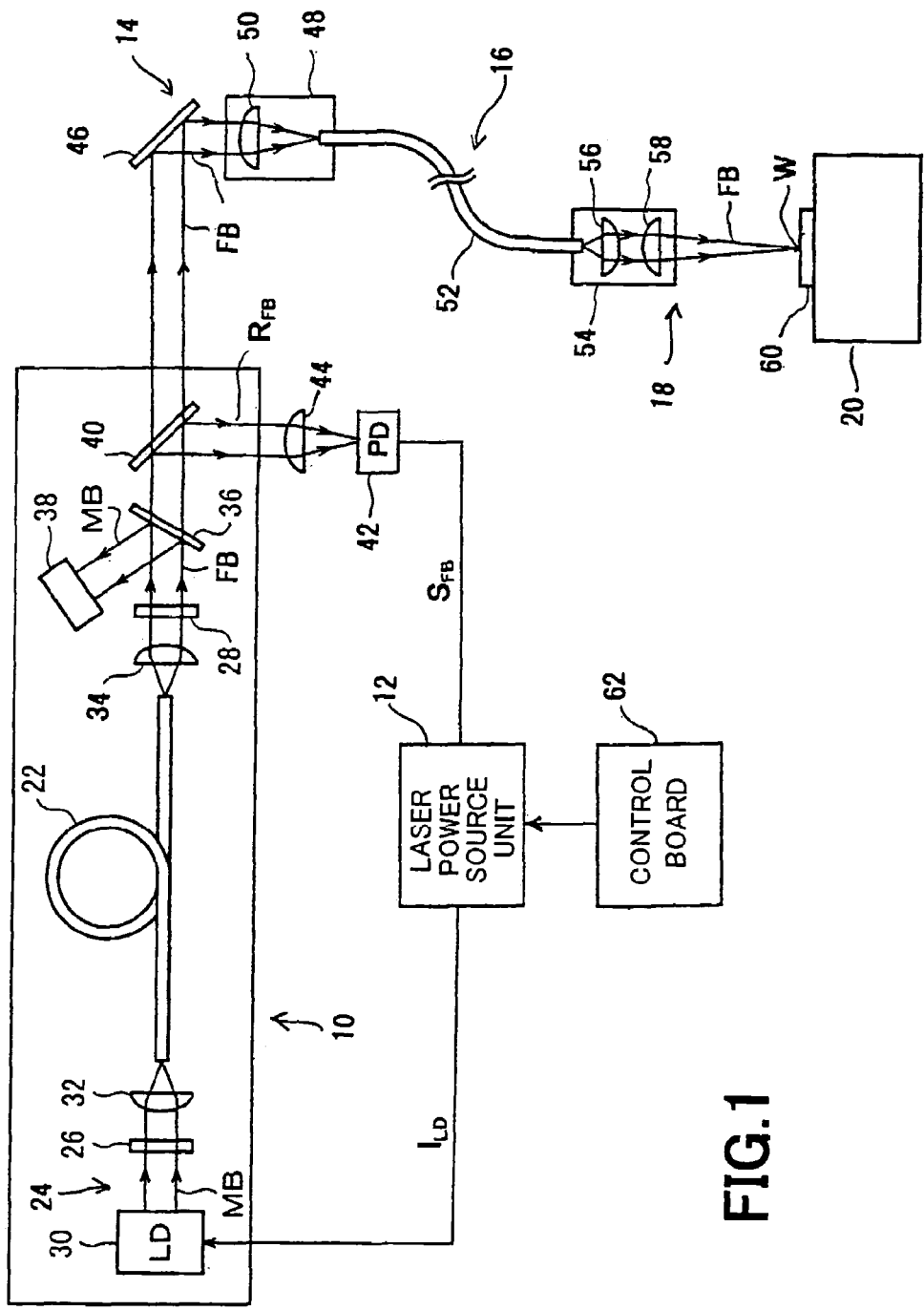
FIG. 1 depicts the configuration of a laser beam processing apparatus according to an embodiment of the present invention.

FIG. 1 depicts the configuration of a fiber laser beam processing apparatus according to an embodiment of the present invention. The fiber laser beam processing apparatus is configured to include a fiber laser oscillator 10, a laser power source unit 12, a laser beam injecting unit 14, a fiber transmission system 16, a laser beam irradiating unit 18, a processing table 20, etc.

The fiber laser oscillator 10 includes an optical fiber for oscillation (hereinafter, "oscillating fiber") 22, an electric optical pumping unit 24 that applies an excitation beam MB for optical pumping onto an end face of the oscillating fiber 22, and a pair of optical resonator mirrors 26 and 28 optically facing each other through the oscillating fiber 22.

The electric optical pumping unit 24 includes a laser diode (LD) 30 and an optical lens 32 for condensing the beam. The LD 30 is turned on and driven by an excitation current from a laser power source unit 12 and oscillates and outputs the laser beam MB for excitation. The optical lens 32 condenses and injects the laser beam MB for excitation from the LD 30 onto an end face of the oscillating fiber 22. The optical resonator mirror 26 disposed between the LD 30 and the optical lens 32 is adapted to transmit the laser beam MB for excitation injected from the LD 30 and to totally reflect on the optical axis of the resonator the excitation beam injected from the oscillating fiber 22.

Though illustration being omitted, the oscillating fiber 22 includes a core doped with ions of, for example, a rare-earth element as a luminous element and a clad surrounding the core coaxially, and uses the core as the active medium thereof and the clad as the propagation optical path for the excitation beam. The excitation laser beam MB injected onto the end face of the oscillating fiber 22 as above propagates in the axial direction in the oscillating fiber 22 being confined by the total reflection on the clad outer circumferential interface, and optically excites the rare-earth element ions in the core by crossing many times the core during the propagation. In this manner, an oscillation beam having a predetermined wavelength is emitted in the axial direction from both end faces of the core. The oscillation beam goes and returns many times between the optical resonator mirrors 26 and 28 and, thereby, is resonance-amplified, and a fiber laser beam FB having the predetermined wavelength is taken out from the optical resonator mirror 28 of the pair that consists of a partially reflecting mirror.

In the optical resonator, the optical lenses 32 and 34 collimate the oscillation beam emitted from the end face of the oscillating fiber 22 into a parallel beam, direct the parallel beam to the optical resonator mirrors 26 and 28, and condense on the end face of the oscillating fiber 22 the oscillation beam reflected and returned by the optical resonator mirrors 26 and 28. The laser beam MB for excitation having passed through the oscillating fiber 22 is transmitted through the optical lens 34 and the optical resonator mirror 28 and, thereafter, is returned by a returning mirror 36 being directed to a laser absorber 38 on the side. The fiber laser beam FB outputted from the optical resonator mirror 28 is transmitted straight through the returning mirror 36, passes through a beam splitter 40, and enters the laser beam injecting unit 14.

The beam splitter 40 reflects a portion (for example, one percent) of the fiber laser beam FB injected into a predetermined direction, that is, toward a light-receiving element for monitoring the power, for example, a photo diode (PD) 42. A condenser lens 44 that condenses the reflected beam from the beam splitter 40 or a monitor beam $R_{FB}$ may be disposed in front of the photo diode (PD) 42.

The photo diode (PD) 42 photo-electrically converts the monitor beam $R_{FB}$ from the beam splitter 40, outputs an electric signal (a laser output measuring signal) $S_{FB}$ that indicates the laser output (the peak power) of the fiber laser beam FB, and sends this signal $S_{FB}$ to the laser power source unit 12.

The fiber laser beam FB having entered the laser beam injecting unit 14 is deflected into a predetermined direction by a bent mirror 46, is condensed by a condenser lens 50 in an injecting unit 48, and is injected onto an end face of an optical fiber for transmission (hereinafter, "transmitting fiber") 52 of the fiber transmission system 16. The transmitting fiber 52 includes, for example, an SI (Step Index)-type fiber and transmits the fiber laser beam FB injected in the injecting unit 48 to an irradiating unit 54 of the laser beam irradiating unit 18.

The irradiating unit 54 includes a collimating lens 56 that collimates a fiber laser beam FD having exited from the end face of the transmitting fiber 52 into a parallel beam, and a condenser lens 58 that condenses the fiber laser beam FB that is a parallel beam onto a predetermined focus position, and condenses and applies the fiber laser beam FB onto a processing point W on a work 60 to be machined.

For example, in the case of laser beam welding, an excitation current having a pulse waveform is supplied from the laser power source unit 12 to the LD 30 and, thereby, the excitation laser beam MB having a pulse waveform is supplied from the LD 30 to the oscillating fiber 22 in the fiber laser oscillator 10 and, thereby, the fiber laser beam FB having a pulse waveform is oscillated and outputted from the fiber laser oscillator 10. The fiber laser beam FB having the pulse waveform passes through the laser beam injecting unit 14, the fiber transmission system 16, and the laser beam irradiating unit 18, and is condensed and applied onto the processing point W on the work 60 to be processed. At the processing point W, a material to be machined is melted by the energy of the fiber laser beam FB having the pulse waveform and, after the application of a pulse, solidifies and forms a nugget.

In the fiber laser beam processing apparatus of the embodiment, the fiber laser oscillator 10 employs the oscillating fiber 22 including an elongated core having a diameter of about 10 μm and a length of about several meters as the active medium and, therefore, can oscillate and output the fiber laser beam FB having a small beam diameter and a small beam divergence angle. In addition, the excitation laser beam MB injected into the end face of the oscillating fiber 22 consumes completely the excitation energy thereof by crossing many times the core while the beam MB propagates on a several-meter-long long optical path in the oscillating fiber 22 and, therefore, the oscillator 10 can create the fiber laser beam FB at a very high oscillation efficiency. The beam mode of the fiber laser oscillator 10 is very stable because the core of the oscillating fiber 22 generates no thermal lens effect. As described below, the laser output of the fiber laser beam FB is normally stabilized corresponding accurately to the desired reference value or the desired reference waveform according to the real-time power feedback control.

As above, because the beam mode and the laser power are both stable and, therefore, the convergence of the fiber laser beam FB onto the transmitting fiber 52 is excellent in the laser beam injecting unit 14 and the laser beam irradiating unit 18 and the injection and the irradiating numerical apertures (NAs) are stable. Therefore, high-precision and high-efficiency fiber transmission is enabled and the quality of the laser beam processing can be improved.

By causing the transmitting fiber 52 to intermediate between the fiber laser oscillator 10 and the laser beam irradiating unit 18 at the processing site, the fiber laser oscillator 10 can be prevented against the disturbances present or generated at the processing site such as vibrations, heat, ambient light, etc. Though the reflected beam from the processing point W may return to the fiber laser oscillator 10 through the laser beam irradiating unit 18, the fiber transmission system 16 and the laser beam injecting unit 14, the returned beam may be confined in the oscillating fiber 22 by making the numerical aperture (NA) of the oscillating fiber 22 larger than the numerical aperture (NA) of the transmitting fiber 52 and, therefore, (without setting the NA excessively large) breakage of the oscillating fiber 22 due to the returned beam can be prevented.

In the fiber laser beam processing apparatus, the fiber laser oscillator 10 (especially the LD 30 and the oscillating fiber 22), the laser power source unit 12, the PD 42, and a controlling board 62 configure a power feedback controlling mechanism to feedback-control in real time the laser output of the fiber laser beam FB.

Figure 2:
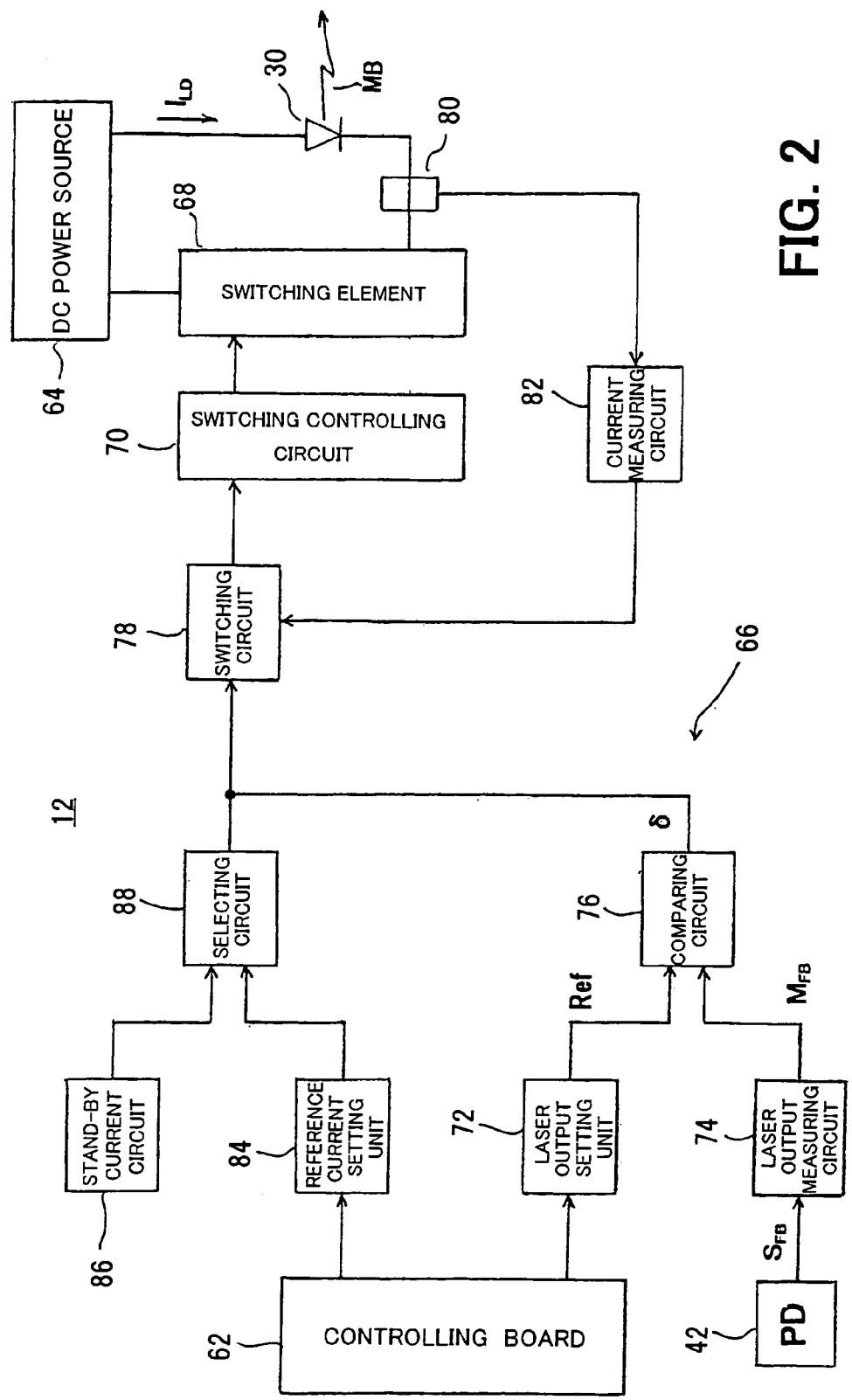
FIG. 2 depicts a block diagram of the configuration in a laser power source unit of the laser beam processing apparatus in the embodiment.

FIG. 2 depicts the configuration inside the laser power source unit 12. As depicted, the laser power source unit 12 is provided with a DC power source 64 that supplies an excitation current $I_{LD}$ to the LD 30 and a controlling unit 66 to control the excitation current $I_{LD}$. The DC power source 64 includes, for example, a transformer, a rectifying circuit, an inverter circuit, etc., and is configured to be inputted with a commercially available AC and outputs a DC LD driving current or a DC excitation current $I_{LD}$.

The controlling unit 66 includes a switching element 68 connected in series to the LD 30 across the DC power source 64, a switching controlling unit 70 that controls the switching of the switching element 68 in, for example, a pulse width modulation (PWM) scheme, a circuit that provides various setting values and a feedback controlling signal to the switching controlling unit 70, etc.

The laser output setting unit 72 retains or outputs a laser output setting value or a setting waveform desired by a user that has been inputted from the controlling board 62 as a reference value or a reference waveform Ref for power feedback control. The laser output measuring circuit 74 obtains a laser output measured value $M_{FB}$ that indicates in real time the laser output of the fiber laser beam FB based on an electric signal (a laser output measuring signal) $S_{FB}$ sent from the PD 42 for monitoring the power. A comparing circuit 76 compares the laser output measured value $M_{FB}$ obtained by the laser output measuring circuit 74 with the reference value or the reference waveform Ref from the laser output setting unit 72, produces a comparison error δ representing the difference therebetween, and provides the comparison error δ to the switching controlling unit 70 through a switching circuit 78.

The switching controlling unit 70 controls the switching of the switching element (for example, a transistor) in the PWM scheme such that the comparison error δ produced by the comparing circuit 76 approaches zero, that is, the laser output measured value $M_{FB}$ equals the reference value or the reference waveform Ref.

In the laser power source unit 12, a current sensor 80 that detects the excitation current $M_{FB}$ and a current measuring circuit 82 that feeds back the measured current value of the excitation current $M_{FB}$ are provided therefore as a current feedback controlling circuit to stabilize the output of the LD 30 when the apparatus is started up. A switching circuit 78 selects a current feedback control immediately after the start of the starting up of the fiber laser oscillator 10, and switches to the power feedback control after the laser output of the fiber laser beam FB is stabilized.

A reference current setting unit 84 sets the reference current value for the current feedback control. A stand-by current circuit 86 is to set a bias current to be flowed to the LD 30 while the oscillator 10 is standing by. A selecting circuit 88 provides the bias current set value to the switching controlling unit 70 while the oscillator 10 is standing by, and provides the reference current value to the switching controlling unit 70 while the oscillator 10 is being started up.

The controlling box 62 constitutes a man-machine interface, includes an input unit such as a keyboard, etc., and a displaying unit such as an LCD display, etc., and also includes a calculating circuit, etc., for condition setting. For example, when the user sets and inputs a desired laser energy value, the controlling box 62 converts the laser energy set value into a laser output set value.

In the embodiment, even when any of variation of the output of the DC power source 64, degradation of the LD 30, shift of the wavelength, etc., occurs, because the above real-time power feedback control works, the laser output of the fiber laser beam FB oscillated and outputted from the fiber laser oscillator 10 is maintained at the value having been set and an arbitrary waveform control is executed accurately according to the settings. When a plurality of fiber laser beam processing apparatuses are operated in parallel, no difference in the laser power among the apparatuses is present and all the processing apparatuses can be set to have the same laser power (or the same laser energy). Therefore, the reproducibility and the reliability of the laser beam processing can be significantly improved.

Though the description has been given for a preferred embodiment as above, the above embodiment does not limit the present invention. Those skilled in the art can make various modifications and changes to the present invention in specific modes of operation thereof without departing from the technical sprit and the technical scope thereof.

For example, in the above embodiment, the fiber laser oscillator 10 and the laser beam irradiating unit 18 are optically connected through the fiber transmission system 16 (the transmitting fiber 52) and the fiber laser oscillator 10 is protected against the disturbances at the processing site as above. However, a scheme or a configuration may be employed according to which the fiber laser beam FB oscillated and outputted from the fiber laser oscillator 10 is sent to the laser beam irradiating unit 18 directly or through a bent mirror, etc., without using the fiber transmission system 16.

In the fiber laser oscillator 10, modification or partial omission is possible for the electric optical pumping unit 24, the optical resonators 26 and 28, the optical lenses 32 and 35, etc., and other components that exert the same functions and operations may be employed. For example, though the above embodiment employs a one-side excitation scheme according to which the excitation laser beam EM is applied to one side of the oscillating fiber 22, a both-side excitation scheme may be employed according to which the excitation laser beam is applied to the end faces on both sides of the oscillating fiber 22. Otherwise, a fiber laser beam of a Q switch pulse can be produced by providing a Q switch in the fiber laser oscillator 10. In the power feedback controlling loop, the monitoring beam RFB from the beam splitter 40 can be transmitted to the PD 42 in the laser power source unit 12 through the optical fiber for transmission by providing the PD 42 in the laser power source unit 12.

The fiber laser beam processing apparatus of the present invention is not limited for laser welding and can be applied to laser beam processing such as laser marking, drilling, and cutting.

What is claimed is:

1. A fiber laser beam processing apparatus for welding a work, the fiber laser beam processing apparatus comprising:
    an optical fiber for oscillation including:
        a core containing a luminous element; and
        a clad surrounding the core;
    a pumping unit to supply the core of the optical fiber for oscillation with an excitation beam, the pumping unit including:
        a laser diode that emits the excitation beam to optically pump the core of the optical fiber for oscillation; and
        an optical lens that condenses the excitation beam from the laser diode onto an end of the optical fiber for oscillation;
    a power source unit that turns on and drives the pumping unit to cause the optical fiber for oscillation to oscillate and output a laser beam having a predetermined wavelength, the power source unit including:
        a DC power source that provides an LD driving current to drive the laser diode; and
        a switching element connected between the DC power source and the laser diode to control the LD driving current;
    a laser beam irradiating unit that condenses and applies the laser beam generated by the optical fiber for oscillation onto a processing point on the work to be welded;
    a setting unit that sets a desired reference waveform for a laser power of the laser beam;
    a laser power measuring unit that measures the laser power of the laser beam oscillated and outputted by the optical fiber for oscillation; and
    a controlling unit that controls in real-time a switching of the switching element of the power source unit in a pulse width modulation scheme such that a laser power measured value obtained from the laser power measuring unit equals the reference waveform.

2. The laser beam processing apparatus of claim 1, further comprising
    an optical fiber for transmission to transmit the laser beam generated by the optical fiber for oscillation to the laser beam irradiating unit.

3. The laser beam processing apparatus of claim 2, further comprising
    a pair of resonator mirrors that optically face each other through the core of the optical fiber for oscillation.

* * * * *